Feb. 6, 1962 J. O. MORIN ET AL 3,020,460
POSITION CONTROL SERVOSYSTEM
Filed July 21, 1958 5 Sheets-Sheet 1

Fig. I

INVENTORS
JOHN O. MORIN
JAMES O. McDONOUGH
HERBERT P. GROSSIMON
BY Kenway, Jenney, Witter & Hildreth
ATTORNEYS Feb. 6, 1962   J. O. MORIN ET AL   3,020,460
POSITION CONTROL SERVOSYSTEM
Filed July 21, 1958   5 Sheets-Sheet 2

INVENTORS
JOHN O. MORIN
JAMES O. McDONOUGH
HERBERT P. GROSSIMON
BY Kenway, Jenney, Witter & Hildreth
ATTORNEYS Feb. 6, 1962 J. O. MORIN ET AL 3,020,460
POSITION CONTROL SERVOSYSTEM
Filed July 21, 1958 5 Sheets-Sheet 4

INVENTORS
JOHN O. MORIN
JAMES O. McDONOUGH
HERBERT P. GROSSIMON
BY
ATTORNEYS

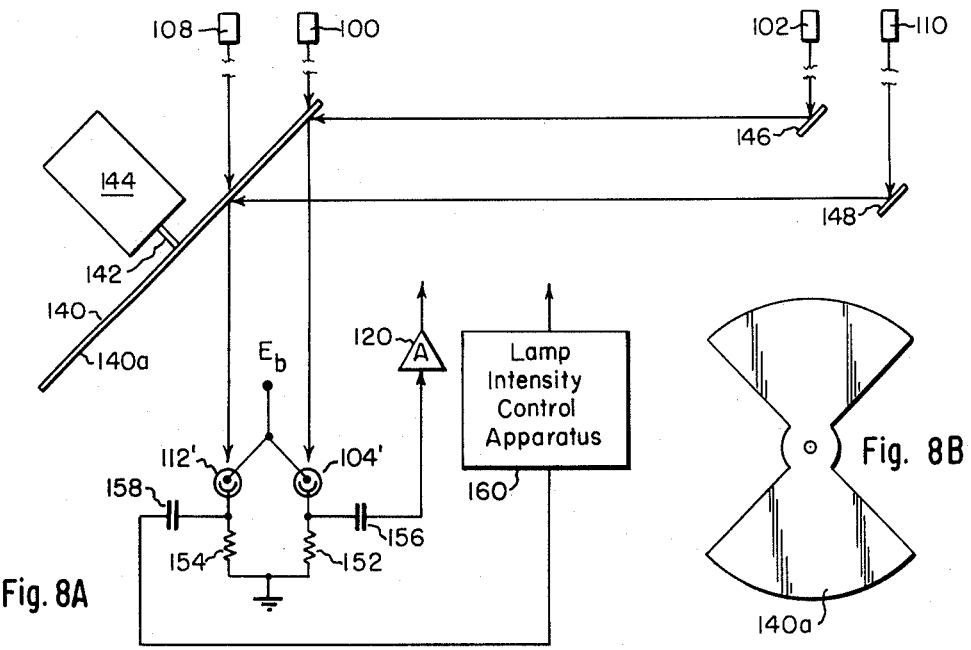
Fig. 8A
Fig. 8B
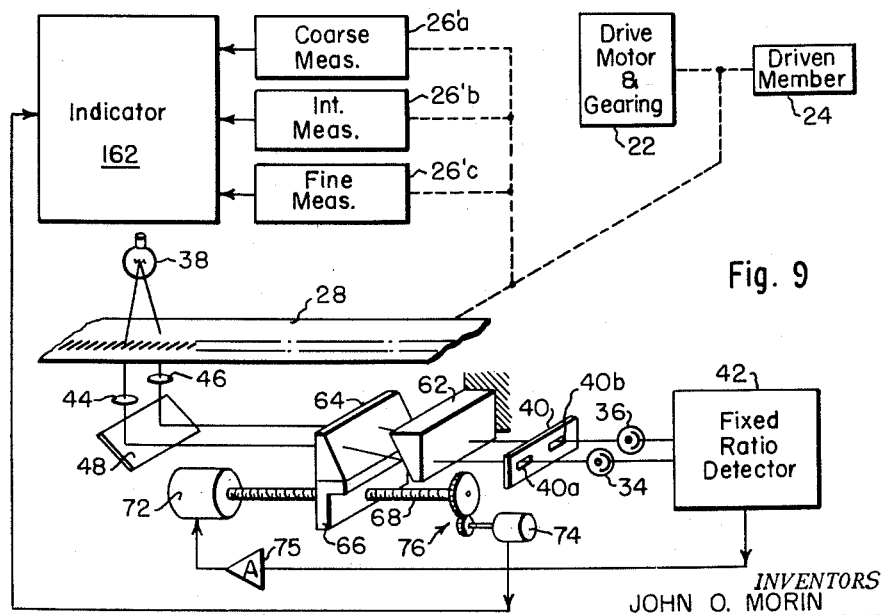
Fig. 9
INVENTORS
JOHN O. MORIN
JAMES O. McDONOUGH
HERBERT P. GROSSIMON
BY
ATTORNEYS

United States Patent Office 3,020,460
Patented Feb. 6, 1962

3,020,460
POSITION CONTROL SERVOSYSTEM
John O. Morin, Bedford, James O. McDonough, Concord, and Herbert P. Grossimon, Arlington, Mass., assignors to The Hartford Special Machinery Co., Hartford, Conn., a corporation of Connecticut
Filed July 21, 1958, Ser. No. 749,788
20 Claims. (Cl. 318—28)

This invention relates to apparatus for automatically setting the position of a driven member or for measuring its position with extreme accuracy; more particularly it relates to apparatus for automatically setting or measuring the position of a rotatable or linearly movable member, such as the work table of a machine tool, with extremely high accuracy.

The production of mechanical parts by machine tools in recent years has involved higher and higher accuracy requirements. Coupled with this has been an extensive development of techniques for automatically controlling machine tools, in particular, methods and apparatus have been developed for controlling machine tools utilizing digital control systems. One of the important advantages of these control techniques is that they eliminate the need for a skilled machinist to operate the tool and permit a relatively less skilled machine operator to control a large number of machine tools.

However, heretofore, when work of extremely high accuracy is to be accomplished, the automatic control systems used with digital processing apparatus have not been completely satisfactory, since the various elements of the machine tool could not be positioned with sufficient accuracy by automatic means. It should be noted that the accuracy limitation was not in the digital control apparatus, which is used to process the input commands to the machine tool, but was rather in the actual servomechanism used in positioning the driven member of the machine tool. In particular, the accuracy limitation lay in the feedback element of the positioning servomechanism, i.e., the element used to measure the position of the driven element and generate a signal uniquely related to the position for comparison with the input command.

In the past, in an effort to achieve high position accuracy, systems such as the three speed synchro positioning system shown in the upper portion of FIG. 1 have been used. As shown therein, the input signal or position command which is in digital form is fed to digital processing apparatus 10. Among the functions performed by this apparatus is the generation of command signals for the various feedback paths. In the positioning system here illustrated, three feedback paths are provided, coarse, intermediate and fine. Accordingly, the digital processing apparatus generates three position command signals. It is to be understood, of course, that command signals may be generated by various types of analog apparatus if this is more desirable for a particular application.

The generated command signals are fed to a plurality of comparators 12, 14 and 16, to which are simultaneously fed the signals from successively finer feedback elements. One of the comparator outputs is selected depending on the relative magnitudes of all of the outputs, by the selector 18, amplifier by amplifier 20 and used to drive the motor and associated gearing 22 that position the driven member 24. At the same time the various feedback elements which are connected to the driven member are positioned by the driven member.

The feedback elements are usually arranged so that a first element 26a, herein the "coarse" element, gives a unique position indication over the entire range of positions which the driven element may take. The second or intermediate element 26b gives a unique position indication over only a portion of the range of the coarse element. Thus, for example, if synchros are used to indicate the position of a rotary table, the "coarse" synchro would be geared in a 1:1 relationship to the table so that it would give a unique position indication at every table location. The intermediate feedback element might be geared in a 36:1 relationship to the table so it uniquely indicates table position anywhere within 10 degrees. Thus when the servomechanism has moved the driven element to a position where the output of the coarse synchro matches the command signal, the selector 18 shifts the input to amplifier 20 from the coarse comparator 12 to the intermediate comparator 14. The signal from the intermediate comparator for a given error in position of the driven element is much larger than from the coarse comparator because of the limited range of the intermediate feedback element, and substantially improved accuracy of positioning can be obtained. An additional "fine" feedback element 26c, is provided when still more accurate positioning is desired. If synchros are used, to indicate the position of a rotary table, for example, the fine synchro might be geared in a 360:1 relationship to the table, giving a unique position output over only a 1° range, with a corresponding increase in position accuracy.

While systems such as that described do provide substantially increased accuracy over that which can be obtained by means of a single synchro, the accuracy of the system is ultimately limited by the accuracy of the gearing used to interconnect the "finest" feedback element and the driven member. For example, in a system using three synchros in the manner described, the accuracy of the table positioning is limited to about 20 seconds of arc. Any greater accuracy is not obtainable due to eccentricity and run out of the gearing as well as imperfections in the tooth form of individual gear teeth. Accuracy of 20 seconds of arc corresponds to a position accuracy of about 1 part in 65,000. If a substantial increase in position accuracy, i.e., one part in 650,000 is desired, a geared system cannot be used.

Another system which has heretofore been used for accurately positioning driven members utilizes a plurality of adjustable stops. These stops are located during set-up at precisely determined locations on the fixed frame of the machine with which the driven member is associated. The position of the stops is sensed by an automatic control system and the driven member is precisely located with respect to the stop. However, the accuracy achievable with stops is of the same order as that achievable with geared coarse and fine feedback elements. Stops also have the disadvantage of requiring lengthy set-up time, and of providing a limited number of stop positions because of space requirements.

To achieve high position accuracy, it has also been proposed that small increments of movement of the driven member may be quantized and measured using digital techniques; when the driven member moves one increment of distance, one pulse, or unit signal would be generated. However, this system only produces an output for movement of the driven member, the number of pulses indicating the magnitude of the driven member's movement. To determine position of the driven member it is necessary to provide apparatus, such as a digital accumulator, to keep track of the total number of pulses which have been generated. This accumulating device requires a large number of vacuum tubes, or equivalent elements, with their attendant problems of expense and reliability. For this reason systems of this latter type have not gone into practical use.

As is apparent from the foregoing discussion, the principal limitation on the accuracy of feedback positioning devices has resulted from inability to accurately measure the position of the driven member. Thus, more accurate means for the measurement, of the position of a movable member can result in a more accurate positioning system.

Accordingly, it is an important object of our invention to provide apparatus for accurate measurement of position of a driven member.

Another important object of our invention is to provide an improved positioning system for the driven element of a servomechanism which will provide substantially increased position accuracy as compared to those systems heretofore available.

Another object of our invention is to provide a positioning system of the character described, which is completely automatic in operation and can be used in conjunction with modern digital control apparatus if desired.

Still another object of our invention is to provide a positioning or measuring system of the character described which has an unlimited number of highly accurate settings, and which does not require extensive set-up time.

Yet a further object of our invention is to provide a positioning or measuring system of the type described which is inexpensive but rugged in construction and reliable in operation.

A feature of our invention resides in the use of a radiation modifying grating or grid to determine a plurality of closely spaced "reference positions" of the driven element, the grid being attached to the driven member.

Another feature of our invention resides in the use of means for interpolating, to a high degree of accuracy, between the reference positions determined by the grid elements.

Still another feature of our invention resides in the use of optical wedges to accomplish the interpolation heretofore mentioned, where an optical grating is used.

Another feature of our invention resides in providing an interpolating device for interpolating between the reference positions of sufficient accuracy so that an extremely large number of grid positions, with their attendant problems of manufacture are not required.

A further feature of our invention resides in providing a circular grid with dual interpolating systems for driven members having a circular motion to thereby compensate for eccentricity errors and errors in grating ruling.

Another feature of our invention is a construction which results in the sensing mechanism being insensitive to variations in intensity of the radiation source.

Other and further objects of our invention, as well as additional features thereof, will in part be obvious and will in part appear hereinafter.

For a more complete understanding of our invention, reference should be had to the following detailed description taken in connection with the accompanying drawings, in which like reference characters refer to the same or similar parts:

FIG. 8a is a schematic diagram illustrating how chopping of the two radiation sources may be utilized to eliminate one pair of the radiation sensitive elements of FIG. 7;

FIG. 8b is a front elevation of the chopper blade of FIG. 8a; and

FIG. 9 is a diagram similar to FIG. 1 illustrating the manner in which apparatus made according to our invention may be used for measuring the position of a driven member, as distinct from controlling its position.

Figure 1:
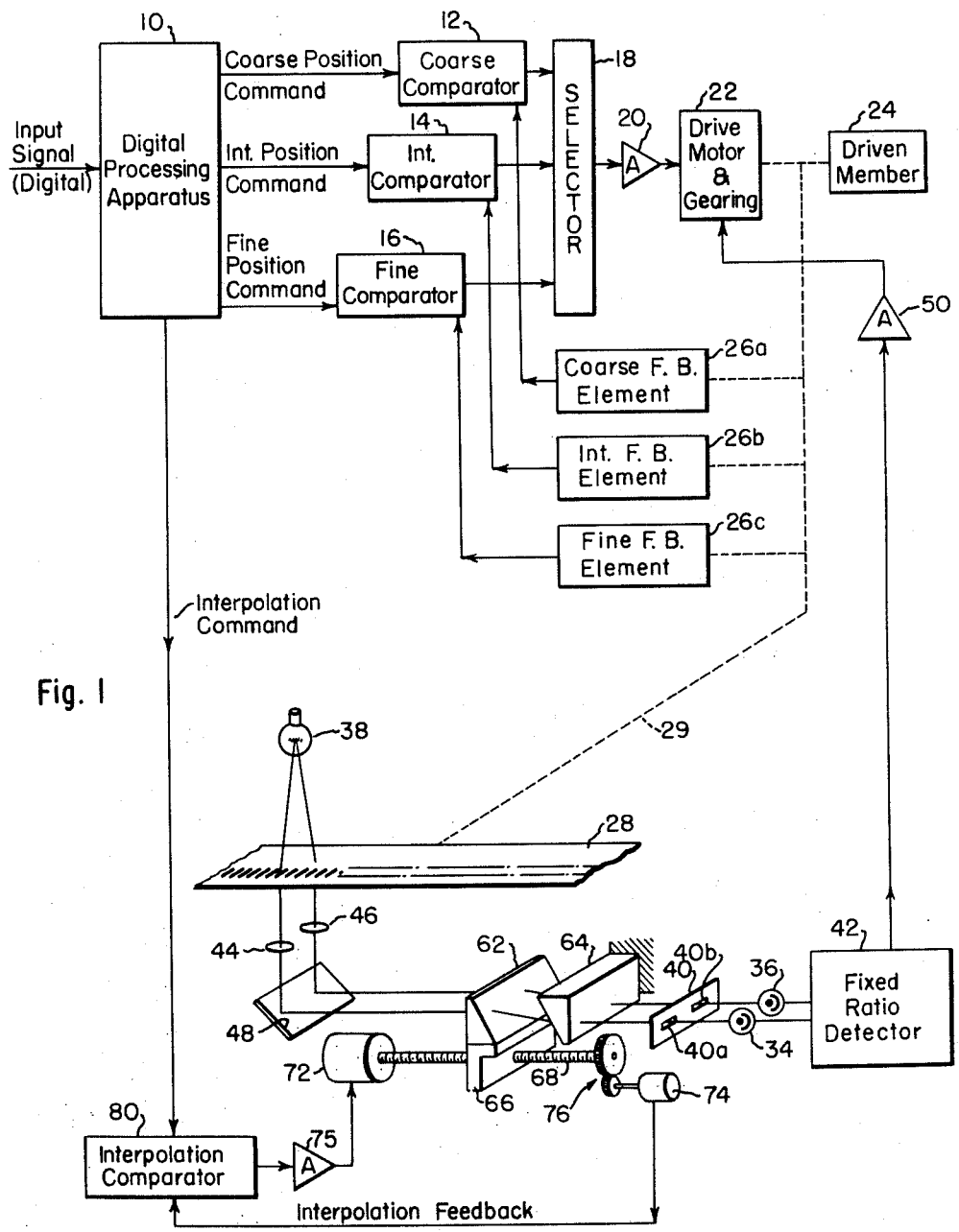
FIG. 1 is a diagram, partially pictorial and partially in block diagram form illustrating a position servomechanism utilizing apparatus made according to our invention for generating a feedback signal.

In general, in positioning systems made according to our invention, a servomechanism of conventional type is utilized to position the driven member as close to the desired position as its accuracy permits. For example, the system schematically illustrated in FIG. 1, and previously described, may be used for this purpose although of course other positioning systems may also be used. A ruled grating, the rulings modifying radiation falling thereon in a manner different than the unruled portions, is mounted on the driven element for movement therewith. The grating may consist for example of alternate areas which are transparent and opaque to visible light. A radiation source, for example a light bulb, is mounted behind the optical grating and illuminates a portion thereof. The image of this illuminated portion is focused on a sensing circuit. The sensing circuit may include a photocell and associated circuitry which will give an output signal dependent on the location of one of the grating lines in the photocell field of view, the field of view usually being limited to a single line. The type of sensing device utilized of course, depends upon the character of radiation used to illuminate the grating. When the grating line, or a portion thereof, is at a particular location in the photocell field of view, the output of the sensing circuit drops to zero. By utilizing the output of the sensing circuit to feed the amplifier and servomotor of the position servomechanism, the driven member may be accurately positioned at a plurality of known positions, corresponding to the individual lines of the grating, each line of the grating corresponding to a position. The particular line of the grating on which the photocell and associated circuitry will position the driven member depends, of course, on the coarse positioning of the table by the coarse servomechanism. Thus, a plurality of "reference positions" are established, each position corresponding to one of the individual grating lines. Because of the high accuracy attainable in the manufacture of gratings, these reference positions are very accurately established.

The system, as thus far described, will position the driven element with the required accuracy at a plurality of reference positions, but only at those positions. To interpolate between these reference positions we provide means for shifting the illuminated grating line or lines with respect to the photocell. The sensing device may itself be physically moved by measured amounts to accomplish this relative movement if desired. However, we have found that a pair of optical wedges through which the light from the grating passes in going to the photocell provides a highly satisfactory interpolation device, and permits the sensing device to remain at a fixed location. These wedges are laterally movable with respect to each other and shift the grating image dependent upon their relative lateral positions. The relative position of the two wedges is controlled by an auxiliary servomechanism which is responsive to an output signal corresponding to the final digits of a number expressing numerically the desired position of the driven member. Thus, accurate interpolation between the highly accurate reference positions is achieved. The servomechanism to position the optical wedges is not required to have extremely accurate positioning, since in general, the reference positions established by the optical grating can be sufficiently closely spaced so that the desired interpolation is only over a relatively small range.

However, because the interpolation device herein described has substantial inherent accuracy, an extremely large number of reference positions are not required to achieve substantial position accuracy. Hence, the grating does not require an inordinately large number of lines.

Figure 2:
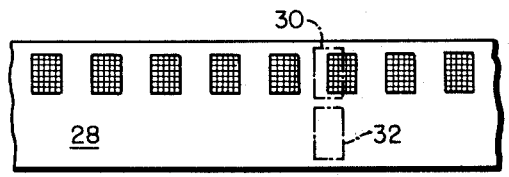
FIG. 2 is a detailed illustration showing one form of grating which may be used in the apparatus of FIG. 1.

More specifically, as shown in FIG. 1 our improved positioning system includes a ruled optical grating 28 affixed to the driven member as indicated by the dashed line 29. The illustrated grating has alternate closely spaced transparent and opaque areas of substantially equal size, the opaque areas being referred to herein as lines, as best seen in FIG. 2. The ruled grating is preferably of transparent material such as glass or plastic, the ruling extending over only a portion of the grating. The dotted areas 30 and 32 shown in FIG. 2 indicate the particular portions of the grating which are imaged on the photocells 34 and 36 respectively, as will be described in greater detail hereinafter. Alternate areas of the grating are blackened or otherwise made non-transparent. The spacing of the grating elements should be as fine as can be conveniently manufactured consistent with the required accuracy. For example, in the linear scale shown, the width of the alternate transparent and opaque areas might be 0.005 inch, giving a total of 100 complete rulings per inch. If the interpolating device then has an accuracy of about 1 part in 200, the system can be positioned to an accuracy of 0.00005 inch. It should also be noted that the ruling of the grating which establishes the reference position should be done with a comparable accuracy. Optical gratings with this accuracy are, however, obtainable from commercial sources.

While our invention will be described with respect to an optical grating having alternate transparent and opaque areas, it is to be understood that gratings of different types could be used without departing from our invention. Thus, the sensing element might be mounted on the same side of the grating as the reference source, and the grating may then be formed of alternate segments of reflecting and transparent material. Alternately, the grating might be formed from sections of material having different refractive indices, the sensing device being so positioned with respect to the source and the grating that material of one refractive index bends radiation from the source away from it, while material of the other refractive index bends the radiation to fall on the sensing device. Gratings of these different types will be generically referred to herein and in the claims as including a plurality of radiation modifying areas.

Referring again to FIG. 1, a radiation source 38 which may be an incandescent lamp, is mounted behind the grating and is arranged to illuminate a portion of it. This illuminated portion is imaged on the photocell 34 or equivalent device. A mask 40 having an aperture 40a formed therein restricts the field of view of photocell 34 so that it can see only one complete transparent area, or one complete opaque area of the grating as shown by the area 30 in FIG. 2. The light source 38 also illuminates the unruled portion of the grating and light passing through the unruled portion illuminates a second photocell 36 through an aperture 40b in mask 40. The photocell 36 compensates the system for variations in source intensity, and provides a reference for the grating illuminated photocell 34.

The photocells are connected to a sensing device 42 herein termed a fixed ratio detector, to be described in greater detail hereinafter.

Lens systems illustrated schematically at 44 and 46 are provided to focus the illuminated portions of the grating on the photocells, and a mirror 48 may be provided if desired, to change the direction of the light from the two illuminated portions of the grating.

Figure 3:
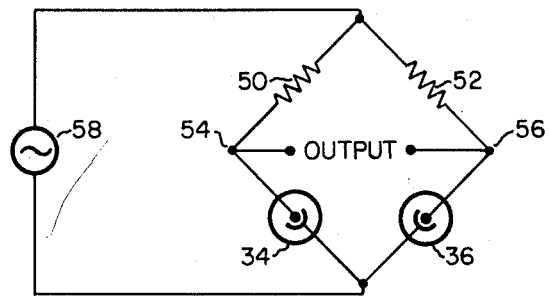
FIG. 3 is a schematic diagram of one form of fixed ratio detector which may be used in the apparatus of FIG. 1.

The fixed ratio detector 42 may utilize a variety of circuits, one of which is illustrated in FIG. 3. As shown therein, the photocells 34 and 36 are connected as corresponding legs of a bridge circuit, the other two legs of the bridge being formed by the fixed resistors 50 and 52. The values of the resistors 50 and 52 are so chosen that the output of the bridge, as measured between the points 54 and 56 will be zero when the light falling on the photocell 34 is some fixed percentage, e.g., 50% of the light falling on the photocell 36. A source of alternating voltage 58 is provided to excite the bridge in a conventional manner.

When the bridge is balanced, i.e., when the light falling on photocell 34 is the chosen fixed percentage of the light falling on photocell 36, no output signal will be produced and there will be no signal to drive the table. If the ratio of light on photocell 34 to that on photocell 36 is chosen as ½, then the position of the grating at the null would appear as shown in FIG. 2. The field of view 30 of the photocell 34 would be obscured to the extent of 50% by one of the opaque areas of the ruled grating. There is thus established a plurality of reference positions for the grating with respect to the fixed photocell 34 at which the bridge output is zero.

For any other position of the grating 28 with respect to the photocell 34, either a greater or lesser portion of the field of view 30 of the photocell will be obscured, the bridge will be unbalanced, and a bridge output will be produced which will tend to move the driven member and the grating 28 mounted thereon to a reference position where the bridge output is zero. The size of the bridge output signal is related to the distance of the grating from the closest reference position, and the phase of the bridge output signal indicates the direction of the grating from this reference position. A direct voltage source may be used in place of the alternating voltage source 58, in which case the polarity of the direct voltage would indicate the direction of the error. Alternatively the light falling on the bridge may be chopped as will be explained in greater detail hereinafter. Changes in intensity of the light source 38 will affect both arms of the bridge in an identical fashion, and hence the bridge is substantially insensitive to such changes.

Finally, it should be noted that the ratio of the light falling on photocell 34 to that falling on photocell 36 for bridge balance does not have to be set to some specific value with great accuracy. As long as the bridge parameters do not change, the bridge will always cause the driven member to be positioned with the same portion of any ruling on the grating obscuring the photocell field of view. Any type of photocell or equivalent device might be used for the photocells 34 and 36.

As shown in FIG. 1, the output of the fixed ratio detector is amplified by power amplifier 50, the output stages of which may be a magnetic amplifier, and is transmitted to the drive motor and gearing 22 to position the driven member 24 exactly on the particular reference position of the grating 28 selected by the coarse positioning system as previously described.

Also, as previously mentioned, the system, as thus far described, will accurately position the driven member only at a plurality of closely spaced accurate locations herein termed reference positions. To provide for accurate positioning of the driven element at a location intermediate the reference positions, we also provide apparatus for accurately interpolating between them.

In general, this is accomplished by accurately shifting either the image of the ruled grating focused on the photocell 34, or the photocell with respect to the image by the desired amount. This is the equivalent of shifting the ruled grating with respect to the driven member; the photocells 34 and 36 and the associated circuitry respond to the shift in the grating image by positioning the driven member at a new position corresponding to the shifted image.

While our invention is described with reference to apparatus for shifting the image with respect to the sensing element, it is to be understood that appropriate apparatus might be used to physically move the sensing element, and such construction falls within the scope of our invention.

As shown in FIG. 1, the image of the illuminated grating is shifted by passing the light therefrom through a pair of transparent optical wedges or prisms 62 and 64. One of the two wedges, in this case wedge 64, is fixedly mounted while the other wedge 62 is mounted on a carriage 66 which in turn is supported for lateral motion on the lead screw 68. The two wedges and the lead screw are so positioned that rotation of lead screw 68 causes translation of carriage 66, and relative movement of the two wedges.

Figure 4:
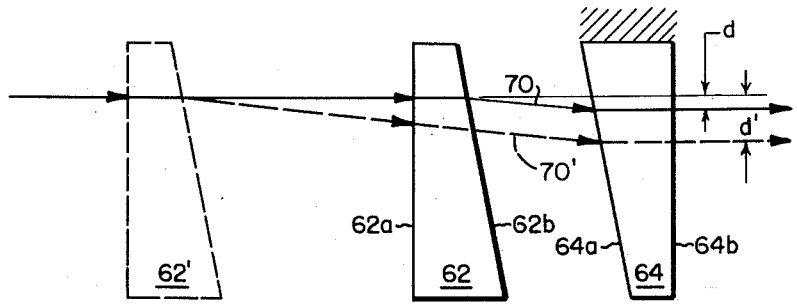
FIG. 4 is a diagram indicating the manner in which the light path through a pair of optical wedges is shifted depending upon their lateral position.

The amount by which the image of the grating is shifted depends upon the lateral distance between the two wedges as illustrated in FIG. 4. As shown therein, when the wedge 62 is in full line position with respect to the wedge 64 a light ray 70 (also shown in full line) impinging on the entrance face 62a of wedge 62 is undeviated in passing through the wedge since the entrance face 62a is normal to the light path. However, on leaving this wedge through the exit face 62b the light is deviated away from the normal to the surface 62b as shown, until it strikes the inclined entrance face 64a of wedge 64. The two wedges are preferably made of material having the same index of refraction and the surfaces 62b and 64a, and surfaces 62a and 64b are arranged to be parallel. Thus, the refraction which the light ray undergoes on entering the wedge 64 exactly cancels the refraction which took place in passing from the wedge 62 to the space between the two wedges, and the light ray is returned to its original direction. No refraction takes place on leaving the wedge 64 since its exit surface is normal to the light path. Because the two wedges are of material having the same refractive index, and the inclined surfaces 62b and 64b are parallel, light entering the pair of wedges normal to the parallel surfaces 62a and 64b will suffer only a deviation, indicated by the distance d, but no change in direction. Further, this deviation is dependent on the distance between the two parallel surfaces 62b and 64a.

Thus, if the wedge 62 is moved to the dotted line position 62' in FIG. 4 increasing the distance between the wedges, then the path of the light ray impinging normally on the entrance surface will be as indicated by the line 70' (shown as a broken line). The deviation in this case is indicated by the distance d'. It is apparent that by shifting the lateral position of the wedges 62 and 64 with respect to each other, the light rays forming the image of the grating may be shifted with respect to the photocell 34. This will unbalance the bridge or other circuit used as a fixed ratio detector which will provide an output signal to reposition the driven member and the grating at a location where the fixed ratio detector ouptut is zero.

Apparatus for accurately positioning the wedge 62 to the desired location is also illustrated in FIG. 1. As previously mentioned, the wedge 62 is mounted on carriage 66 which in turn is supported on lead screw 68. A servo motor 72 is provided to drive the lead screw, and a synchro, or other feedback device 74 is geared thereto, as by gearing 76 to measure the position of the movable wedge.

It is important to note that if a synchro is used, it should be geared to the lead screw in such fashion that the synchro makes only a partial revolution, e.g., ½ a revolution, for full travel of the wedge along the screw. Otherwise ambiguities may result. For example, assume that the synchro is geared to the lead screw in a 1:1 relation and the 0° and 360° positions of the synchro correspond to the end positions of the wedges. The 0° and 360° positions of the synchro are however indistinguishable. Thus if the wedge is located at one extreme of its travel, corresponding to a 360° synchro position, and a command requiring the wedge to be at the other extreme position, 0°, occurs, the wedge would not move. Further, in some instances, in positioning the wedge to the nearest null position corresponding to the command signal, the wedge position servo might tend to drive the wedge in the wrong direction and into the limits.

The wedge or interpolation command signal is generated in the digital processing apparatus 10 and, in general, corresponds to the final digits of the desired position command when the command is expressed in numerical form. The signal is fed to the interpolation comparator 80 to which is also fed the interpolation feedback from the synchro 74, or other feedback device. The difference signal is amplified in conventional fashion by amplifier 75 and fed to the lead screw drive motor 72 to position the optical wedge 64 at the desired interpolation position, as indicated by the interpolation command signal. In this manner highly accurate positioning of the driven member may be achieved.

Figure 5:
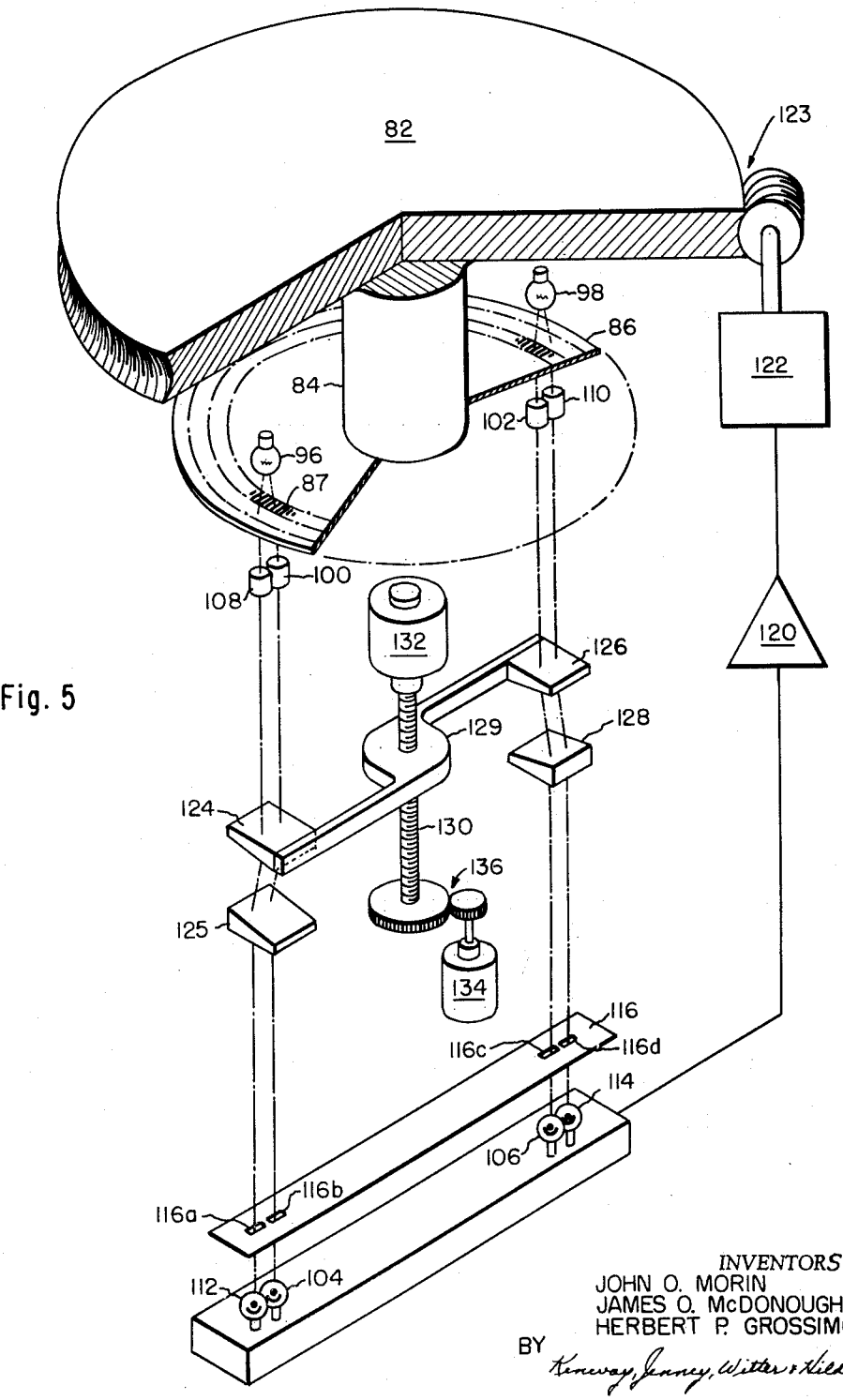
FIG. 5 is a diagram, partially pictorial and partially in block diagram form which illustrates an embodiment of positioning apparatus made according to our invention as used for sensing circular motion.
Figure 6:
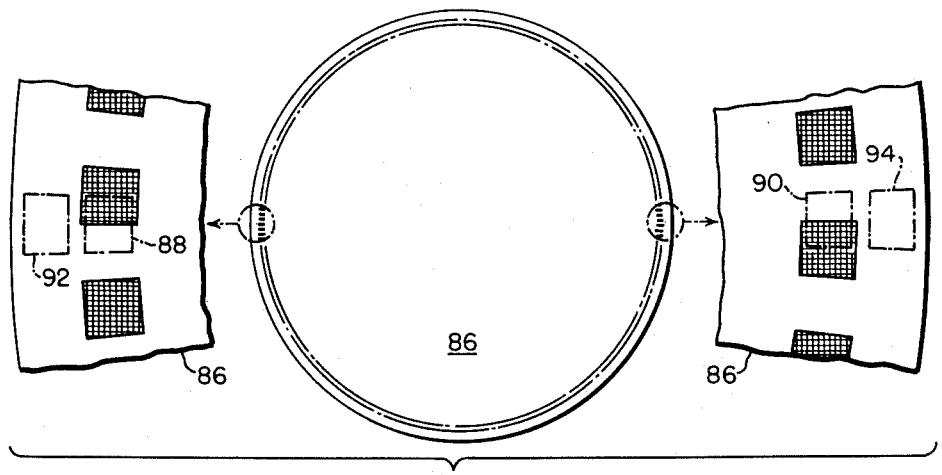
FIG. 6 is a detailed illustration showing one form of the grating of FIG. 5 and the areas viewed by the photocells.

The positioning system illustrated in FIG. 1, as so far described would be particularly applicable to the positioning of a linearly movable mmber. When it is desired to position a circular member to a precise angle, the embodiment of our invention illustrated in FIG. 5 may be utilized. As shown in FIG. 5, a circular table 82 which might, for example, be the table associated with a jig borer, is fixed to a spindle 84 to which is also affixed a circular disk 86 having a ruled optical grating 87 thereon which is similar to the grating 28 previously described in connection with FIG. 1. As shown in FIG. 6, the grating 87 is an annular band which is precisely ruled into alternate transparent and opaque areas. Other radiation modifying gratings might also be used for grating 87, as explained in connection with FIG. 1. The disk 86 is also provided with at least one band or area close to the grating 87 which is transparent or substantially so. The spacing of the alternate light and dark areas of the grating is such that interpolation between them can be accomplished to the desired accuracy without imposing extreme accuracy requirements on the interpolation device as previously mentioned. In the system shown herein, the alternate opaque areas, might be spaced by approximately one-quarter a degree and be one-quarter a degree wide where it is desired to position the table to an accuracy of 2 seconds. The areas 88, 90, 92 and 94 of FIG. 6 indicate the area viewed by each of the photocells to be hereinafter described.

As shown in FIG. 5, light sources 96 and 98 are mounted at points spaced 180° apart and each is arranged to illuminate both the grating 87 and the fully transparent area adjacent thereto on the disk 86. Lens systems shown schematically at 100 and 102, respectively, focus the image of the grating illuminated by the light source 96 and 98 on the photocells 104 and 106 respectively while lens systems 108 and 110 focus the image of the unruled portion of the disk 86 on the photocells 112 and 114, respectively. A mask 116 having apertures 116a, 116b, 116c and 116d therein limits the field of view of the photocells to that shown in FIG. 6. Thus, photocell 104 is limited to the area 88, photocell 106 to the area 90, photocell 112 to the area 92, and photocell 114 to the area 94 on the disk 86.

Figure 7:
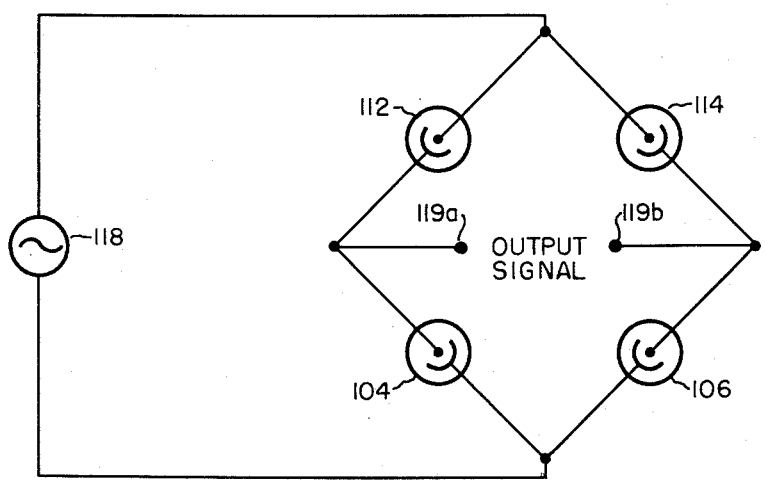
FIG. 7 is a schematic diagram illustrating a circuit for interconnecting the photocells used in FIG. 5 to produce the desired output signal.

The four photocells are connected in a circuit to provide an output signal when the light striking the photocells is some fixed percentage of the light falling on the reference photocells 112 and 114. A preferred form of circuit for this purpose is illustrated in FIG. 7. As shown therein, the four photocells are connected in a bridge circuit, one leg of the bridge including the photocells 112 and 104, and the other leg the photocells 114 and 106. A source of alternating electric voltage 118 is provided to excite the bridge in a conventional fashion and the output of the bridge is taken at the terminals 119a and 119b.

With the arrangement shown in FIG. 7, the bridge will be balanced only when the field of view of the photocells 104 and 106 are equally obscured by the opaque areas in their field of view. This will occur when the ruled areas in the field of view of each of the photocells 104 and 106 cover substantially half of the fields of view 88 and 90. If, for example, the grating is rotated slightly clockwise from the position illustrated in FIG. 6, the photocell 106 whose field of view is the area 90 will be illuminated by more than 50% of the light falling on the photocell 114, while the photocell 104 will be illuminated by less than 50% of the light falling on the photocell 112 whose field of view is the area 92, i.e., the photocell 106 has more light falling on it and the photocell 104 has less light falling on it than is required for bridge balance. As shown in FIG. 5, the bridge output is amplified by a power amplifier 120 and fed to the drive motor 122 and gearing 123 to drive the table 82 and the disk 86 to a location where the bridge is balanced. A similar process takes place for a counterclockwise error.

Two pairs of wedges are provided for two light paths indicated, the wedges 124 and 125 providing a shift of the image of the grating formed on the photocell 104 and the wedges 126 and 128 performing a similar function for the portion of the grating focused on the photocell 106. The two movable wedges 124 and 126 are mounted on a yoke 129 which in turn is supported on the lead screw 130. An interpolation drive motor 132 is provided as is a feedback device 134, which may be a synchro or the like, together with associated gearing 136. The interpolation drive motor and the feedback synchro perform the same functions as previously described in connection with the embodiment of FIG. 1. Similar electrical apparatus to that shown in FIG. 1 (not shown in FIG. 5) is associated with these latter devices.

As described, the construction illustrated in FIG. 5 compensates for variations in the intensity of sources 96 and 98 by adjusting the balance of the bridge, using photocells 112 and 114 or other radiation sensitive elements for this purpose.

In some applications it may be undesirable to provide four radiation sensitive devices for this purpose, and in FIG. 8 we have illustrated apparatus which utilizes only two such devices with means for chopping, i.e., alternately exposing each of the two cells to the light from the two sources.

As shown therein, a chopper whose blade 140 has a "butterfly" shape such as that in FIG. 8b is provided, the blade being adjusted to cross the optical path between the lenses 100 and 108 and photocells 104' and 112' at approximately 45°. The chopper blade is mounted on a shaft 142 which is in turn driven by the chopper motor 144. The fixed 45° mirrors 146 and 148 cause the light from the lens systems 102 and 110 to bend at right angles and strike the front face 140a of the chopper blade 140. The surface 140a is a mirror surface, so that when the chopper blade obscures the light from the lens systems 100 and 108, light from the lens systems 102 and 110 will impinge on the two photocells. The photocells 104' and 112' are energized from a voltage source, shown illustratively as E$b$, while the photocell cathodes are grounded via resistors 152 and 154.

It will be readily apparent that as chopper blade 104 rotates, light from either lens system 100 or lens system 102 (after passing through the optical wedges) will illuminate photocell 104'. When the light from both sources is equal in amplitude, no alternating component of voltage will be produced across resistor 152. However, if the amplitudes of the two chopped beams is unequal, indicating that the table 86 is improperly positioned, an alternating component will be developed across resistor 152, which is coupled via condenser 156 to the input of amplifier 120. The output of amplifier 120 then drives the table until the alternating input signal is zero.

In a similar manner, if the reference beams passing through lens systems 108 and 110 are unequal, an alternating signal will be developed across resistor 154, which is coupled via condenser 158 to conventional apparatus 160 for adjusting the intensity of one of the two lights, as for example light 98. In this manner both lights are maintained at equal illumination thereby eliminating spurious driving signals due to unequal lamp illumination.

Thus, by use of the two photocells and the chopper of FIG. 9, the four photosensitive elements of FIGS. 5 and 7 can be reduced to two, although all of the same functions are performed.

It will also be apparent, that the table of FIG. 5 could be positioned with substantially accuracy using only one of the light sources and sensing positions shown therein. However, we have found that, by utilizing two sources and their associated sensing equipment errors resulting from eccentricity of mounting of the table 82 and disk 86 on the spindle 84 are eliminated, as is any eccentricity of the graduations or rulings on the disk 86. Errors in the graduation positions themselves are averaged by the bridge network previously described to take the arithmetic mean of any errors. Thus, by using two light sources and associated sensing equipment on a circular table, substantially improved position accuracy may be obtained.

While no coarse positioning servo is illustrated in FIG. 5 it is obvious that a position servo similar to that illustrated in FIG. 1 would be used to position the table 82 and disk 86 as close as possible to the desired reference position, final positioning being achieved by the optical positioning system herein described.

Thus far we have described our improved device as a feedback element in an accurate positioning system. As previously mentioned, however, our invention may also be used to measure the position of a driven member, and its use for this purpose is illustrated in FIG. 9. This figure is similar to FIG. 1, and like reference characters refer to similar parts.

As shown in FIG. 9, the measuring system includes a coarse measuring system here illustrated by the measuring elements 26'a, 26'b and 26'c, which correspond to the coarse, intermediate and fine feedback elements of FIG. 1. These elements may be synchros, or any other conventional measuring elements which are mechanically connected to the driven member. As shown, the outputs of these measuring elements are connected to the indicator 162.

The grating 28 is also connected to the driven member, and the various elements associated with the grating perform the same functions as previously described. However, as shown in FIG. 9, the output of the fixed ratio detector 42 is amplified and used as an input signal for drive motor 72 rather than being used to drive the driven member. Motor 72 will therefore drive until, by positioning the optical wedge 62, the output of detector 42 is a minimum. In so doing, the motor 72 also positions synchro 74, or a like device, which measures the position of the wedge 62, and is therefore a measure of the "fine" position of the movable member. The output of element 74 is also connected to the indicator, where combined with the signals from the measuring element 26a, 26b and 26c, an extremely accurate indication of the position of the driven member is obtained. While various types of indicators may be used, including digital types if desired, a simple indicator might include four synchro repeaters, one connected as a repeater to each of the elements 26a, 26b, 26c and 74 where these elements are synchros. A dial, mounted on the shaft of each synchro repeater then indicates the repeater shaft angular position with respect to a fixed reference mark, and the combined reading of the coarse and fine measuring systems would indicate table position. While we have illustrated our invention as a measuring device in connection with a linearly translatable driven member, it is obvious that it may also be applied to the rotating system illustrated in FIG. 5.

It will thus be seen that we have provided a system for automatically positioning with improved accuracy the driven member of a position servomechanism or for accurately measuring its position. Our system may be applied to either translating devices, as illustrated in FIG. 1, or rotating devices, as shown in FIG. 5. In our system a plurality of accurately spaced reference positions are provided by the use of a grating having a plurality of radiation modifying areas, and interpolation between the reference positions is preferably accomplished by a pair of relatively movable optical wedges or prisms, whose relative position is determined by a servomechanism. The interpolation servomechanism responds to a signal which corresponds to the final digits of a number representing the desired position of the driven element when used as a positioning device. When used as a measuring device, the interpolation servomechanism generates a signal corresponding to these final digits of the number representing the table position. It will be readily apparent to those skilled in the art that the improved positioning and measuring system described herein may be applied to any device in which highly accurate automatic positioning or precise measuring is desired. Also, while we have described our positioning system with respect to a digitally controlled machine tool, it will be obvious that the control signals for use with our positioning system may be generated by various analog means such as synchros, or resolvers. It will also be apparent that while we have described our positioning system with respect to an optical disk, optical wedges for interpolation and photocells as sensing elements, other types of radiation such as infrared or ultraviolet radiation with appropriate elements might be substituted for the optical elements herein described. With the improved system of our invention it is possible to accurately position a driven member automatically to any desired location or to measure its location without any previous set up, and yet the system is relatively inexpensive and rugged in construction.

It will thus be seen that the objects set forth above, as well as those apparent from the foregoing description, have been efficiently attained and, since certain changes may be made in the apparatus set forth without departing from the scope of the invention, it is intended that all matter contained in the above description or shown in the accompanying drawings, shall be interpreted as illustrative and not in a limiting sense. It is also to be understood that the following claims are intended to cover all of the generic and specific features of the invention herein described, and all statements of the scope of the invention, which as a matter of language, might be said to fall therebetween.

Having described our invention, we claim:

1. Apparatus for automatically and accurately positioning a driven member comprising, in combination a first automatic control system positioning said driven member to the approximate desired position, and a second positioning system adapted to accurately position said driven member at the desired location, said second system being operative after said first system has approximately positioned said driven member, said second system including a grating secured to said driven member for movement therewith, said grating having a plurality of radiation modifying areas, a source of radiant energy to which a portion of said grating is exposed, means responsive to a portion of the radiant energy from said source modified by said grating, said energy responsive means being fixed with respect to said driven member, said radiation responsive means being adapted to generate continuously variable signal which is uniquely related to the distance and direction of at least one of the radiation modifying areas of said grating from a predetermined location determined by the position of said radiation responsive means, and means continuously responsive to said signal to drive said driven member until said radiation modifying area is at said predetermined location with respect to said radiation responsive means to thereby accurately position said grating and the driven member associated therewith.

2. Apparatus for automatically and accurately positioning a driven member comprising, in combination an automatic control system positioning said driven member to the approximate desired position, a grating secured to said driven member for movement therewith, said grating having a plurality of radiation modifying areas, a source of radiant energy to which a portion of said grating is exposed, means responsive to a portion of the radiant energy from said source modified by said grating, said radiation responsive means being adapted to generate a continuously variable signal which is uniquely related to the distance and direction of at least one of the radiation modifying areas of said grating from a predetermined location, means continuously responsive to said signal to drive said driven member until said radiation modifying area is at said predetermined location with respect to said radiation responsive means to thereby accurately position said grating and the driven member associated therewith, and interpolating means for providing controlled relative motion between the radiant energy modified by said grating and said radiation responsive means whereby said driven element may be positioned at a location other than that corresponding to a radiation modifying area.

3. The combination defined in claim 2 in which said interpolating means includes controllable means interposed between said grating and said radiation responsive means for deviating the radiation modified by said grating with respect to said radiation responsive means, and means responsive to an electrical signal for controlling said radiation deviating means.

4. Apparatus for automatically and accurately positioning a driven member comprising, in combination, a first automatic control system for positioning said driven member to the approximate desired position, a second control system for accurately positioning said driven member at the desired location, said second system being operative after said first system has approximately positioned said driven member, said second system including an optical grating having a plurality of alternate transparent and opaque areas formed thereon, said grating being mounted for movement with said driven element, a light source positioned on one side of said grating, means responsive to a portion of the light from said source passed through said grating, said light responsive means being fixed with respect to said driven member and adapted to generate a continuously variable electrical signal which is uniquely related to the distance and direction of at least one of said illuminated opaque areas of said grating form a predetermined location determined by the position of said light responsive means, and means continuously responsive to said electrical signal to drive said driven member until said opaque area is at said predetermined location to thereby accurately position said grating and the driven member associated therewith.

5. Apparatus for automatically and accurately positioning a driven member comprising, in combination, an automatic control system for positioning said driven member to the approximate desired position, an optical grating having a plurality of alternate transparent and opaque areas formed thereon, said grating being mounted for movement with said driven element, a light source positioned on one side of said grating, means responsive to a portion of the light from said source passed through said grating, said light responsive means being adapted to generate a continuously variable electrical signal which is uniquely related to the distance and direction of at least one of said illuminated opaque areas of said grating from a predetermined location, means continuously responsive to said electrical signal to drive said driven member until said opaque area is at said predetermined location to thereby accurately position said grating and the driven member associated therewith and means for interpolating between successive reference positions established by said grating, said interpolating means including means for providing controlled relative motion between said light responsive means and the light passing through said grating and falling thereon.

6. Apparatus for automatically and accurately positioning a driven member comprising, in combination, an automatic control system for positioning said driven member to the approximate desired position, an optical grating having a plurality of alternate transparent and opaque areas formed thereon, said grating being mounted for movement with said driven element, a light source positioned on one side of said grating, means responsive to a portion of the light from said source passed through said grating, said light responsive means being adapted to generate a continuously variable electrical signal which is uniquely related to the distance and direction of at least one of said illuminated opaque areas of said grating from a predetermined location, means continuously responsive to said electrical signal to drive said driven member until said opaque area is at said predetermined location to thereby accurately position said grating and the driven member associated therewith and means for interpolating between successive reference positions established by said grating, said interpolating means including controllable means for optically deviating the light passing through said grating and falling on said light responsive means.

7. The combination defined in claim 4 in which said transparent and opaque areas are substantially equal in size within the field of view of said light responsive means.

8. Apparatus for automatically and accurately positioning a driven meber comprising in combination an automatic control system for positioning said driven member to the approximate desired location, an optical grating having a plurality of light modifying areas formed thereon, said grating being mounted for movement with said driven member, a light source positioned on one side of said grating for illuminating a portion thereof, light responsive means positioned to intercept a portion of the light modified by said grating, the field of view of said light responsive means being restricted to the portion of said grating illuminated by said light source, electric circuit means associated with said light responsive means for generating an electrical signal dependent upon the direction and distance of at least one of said light modifying areas of said grating from a predetermined position with respect to said light responsive means, and means responsive to said electrical signal to drive said driven member until said light modifying area is at said predetermined location, a pair of spaced optical wedges interposed in the optical path between said grating and said light responsive means, the inclined faces of said wedges being in opposed relationship, said wedges causing a shifting of the light modified by said grating falling on said light responsive means depending upon the distance between said inclined faces, and electrically controllable means for varying the relative position of said wedges, whereby the position of said driven member may be varied from said predetermined location.

9. The combination defined in claim 8 in which said optical wedges are of material having substantially the same index of refraction.

10. The combination defined in claim 8 in which the entrance face of the wedge closest to said grating and the exit face of the wedge closest to said light responsive means are parallel and substantially normal to the optical axis between said grating and said light responsive means.

11. The combination defined in claim 8 in which one of said optical wedges is fixed in position and the other of said wedges is mounted on a linearly movable carriage, said carriage being supported on a lead screw, a servomotor for rotating said lead screw, a feedback element adapted to generate an electrical signal which is related to the position of said wedge, means for comparing the signal from said feedback element with an electrical signal related to the desired position of said wedge, amplifying means for amplifying the difference between said signals, and means connecting the output signal from said amplifying means to said servomotor.

12. The combination defined in claim 11 in which said feedback element is a synchro geared to said lead screw, said gearing being so arranged that said synchro makes not more than ½ a full revolution for travel of said carriage along said lead screw corresponding to movement of said disk between adjacent reference positions.

13. Apparatus for automatically and accurately positioning a driven member comprising, in combination, a first automatic control system for positioning said driven member to the approximate desired location, and a second positioning system which becomes operative when said first system has approximately positioned said member, said second system comprising a grating having a plurality of radiation modifying areas, said grating being mounted for movement with said element, a radiation source to which a portion of said grating is exposed, a pair of radiation sensitive elements, a first of said elements being responsive to a portion of the radiation from said source modified by said grating, and a second of said elements being responsive to radiation from said source unmodified by said grating, electrical circuit means associated with said radiation sensitive elements, said first radiation sensitive element and said electric circuit means being adapted to generate an electrical signal depending upon the direction and distance of at least one of said radiation modifying areas of said grating from a predetermined fixed location with respect to said radiation sensitive element and the second of said elements compensating said signal for variations in intensity of said radiation source, means responsive to the electrical signal generated by said radiation sensitive elements and said electric circuit means to drive said driven member until at least one of said radiation modifying areas is at said predetermined location, to thereby accurately position said grating and the driven member associated herewith with respect to said first radiation sensitive element.

14. Apparatus for automatically and accurately positioning a driven member comprising in combination a first automatic control system for positioning said driven member to the approximate desired location, and a second positioning system which becomes operative when said first system has approximately positioned said member, said second system comprising a ruled optical grating having a plurality of transparent and opaque areas formed on a transparent support, said support being mounted for movement with said driven member, a light source positioned on one side of said transparent support for illuminating a portion thereof, a pair of photocells positioned on the other side of said transparent member, the field of view of a first of said cells being restricted to the portion of said grating on said transparent member illuminated by said light source, and the field of view of the second of said cells being restricted to the transparent area of said transparent member, electric circuit means associated with said first photocell for generating an electrical signal dependent upon the direction and distance of at least one of said opaque areas of said grating from a predetermined fixed position with respect to said first photocell, the second of said photocells compensating said first photocell and said electric circuit means for variations in intensity of said light source, and means responsive to said electrical signal to drive said driven member until at least one of said opaque areas is at said predetermined location with respect to said first photocell.

15. The combination defined in claim 14 which includes interpolating means for interpolating between positions corersponding to said opaque areas, said interpolating means including, a pair of spaced optical wedges interposed in the optical path between said transparent member and said photocells, the inclined faces of said wedges being in opposed relationship, said wedges causing a shifting of the light falling on the photocells depending upon the distance between said inclined faces thereof and electrically controllable means for varying the relative position of said wedges, to thereby vary the position of said driven member from said predetermined location.

16. Apparatus for automatically and accurately positioning a rotatable driven member with substantial accuracy comprising, in combination, a disk mounted for rotation with said driven member, said disk including a first transparent annular band and a second annular band including a plurality of alternate transparent and opaque areas, two light sources, said light sources being positioned such that each source illuminates a portion of each of said bands, a pair of photocells associated with each of said light sources, a first of said photocells in each pair being responsive to light form said light source passed through said transparent band, and a second of said photocells in each pair being responsive to light from said light source passed through said band of alternate transparent and opaque areas, electric circuit means associated with said photocells whereby the second of said photocells in each pair and said circuit means, in combination, provide an electrical signal related to the direction and distance of at least one of said opaque areas of said grating from a predetermined position in the field of view of each of said photocells, and the first of said photocells in each pair compensates said circuit for differences in intensity of said light sources, an amplifier, means connecting the signal from said photocells and said electric circuit means as the input signal to said amplifier, a drive motor, means connecting the output of said amplifier as an input signal to said drive motor and means connecting the shaft of said drive motor to said table to drive said table in response to output signals from said amplifier to thereby position said disk at location where one of the opaque areas formed thereon is at said predetermined location, a pair of spaced optical wedges interposed between the illuminated portions of said grating and the photocells associated therewith which are responsive to light from said illuminated portion, the inclined faces of said wedges being in opposed relationship, said wedges causing a shifting of the light falling on the photocells associated therewith depending upon the distance between said inclined faces, and electrically controllable means for varying the relative position of said wedges, whereby the position of said driven member may be varied from said predetermined location in response to an electrical signal.

17. Apparatus for accurately measuring the position of a movable member comprising, in combination, means for measuring the approximate position of said member, and means for determining the precise position of said member within said approximate position, said last mentioned means including a grating secured to said movable member having a plurality of radiation modifying areas formed thereon, a source of radiant energy to which a portion of said grating is exposed, means responsive to a portion of the radiant energy from said source modified by said grating, said radiation responsive means being adapted to generate a signal depending upon the distance and direction of at least one of said radiation modifying areas of said grating from a predetermined location with respect to said radiation responsive means, controllable means for causing relative motion between the radiant energy modified by said grating and said radiation responsive means, means responsive to the signal from said radiation responsive means to operate said controllable means to cause relative optical movement of said radiation modified by said grating and said radiation responsive means, until at least one of said radiation modifying areas is at said predetermined location with respect to said radiation responsive means, and means for measuring the relative positions of said radiation modifying means and said radiation responsive means when said radiation modifying area is at said predetermined location.

18. Apparatus for accurately measuring the position of a movable member comprising, in combination, means for measuring the approximate position of said member, and means for determining the precise position of said member within said approximate position, said last-mentioned means including a grating secured to said movable member for movement therewith, said grating including a plurality of alternate transparent and opaque areas, a light source positioned to illuminate a portion of said grating, a photocell positioned to receive a portion of the light passing through said grating, an electric circuit associated with said photocell and adapted, in combination with said photocell, to generate an electrical signal dependent upon the distance and direction of at least one of said opaque areas of said grating from a predetermined location with respect to said photocell, controllable means for causing relative movement between the light beam passing through said grating and said photocell, means responsive to the signal generated by said photocell and said electric circuit to operate said controllable means and cause relative movement between said light beam and said photocell until at least one of said opaque areas is at said predetermined location with respect to said photocell, and means for measuring the relative positions of said light beam modifying means and said photocell when said opaque area is at said predetermined location.

19. The combination defined in claim 11 in which said controllable means for causing relative movement between said light beam and said photocell includes a pair of spaced optical wedges interposed in the optical path between said grating and said photocell, the inclined faces of said wedges being in opposed relationship, said wedges causing a lateral shifting of the light modified by said grating falling on said photocell, dependent upon the distance between said inclined faces, and electrically controllable means for varying the distance between the inclined faces of said wedges.

20. The combination defined in claim 11 which includes a second photocell, said second photocell being illuminated by light from said light source passing through a transparent portion of said grating, said second photocell compensating the signal produced by said first photocell and said electric circuit for variations in intensity of said light source.

References Cited in the file of this patent

UNITED STATES PATENTS

| | | |
|---|---|---|
| 2,537,427 | Seid et al. | Jan. 9, 1951 |
| 2,848,670 | Kelling et al. | Aug. 19, 1958 |
| 2,867,759 | Comstock | Jan. 6, 1959 |

UNITED STATES PATENT OFFICE
CERTIFICATE OF CORRECTION

Patent No. 3,020,460                  February 6, 1962

John O. Morin et al.

It is hereby certified that error appears in the above numbered patent requiring correction and that the said Letters Patent should read as corrected below.

Column 13, line 33, for "meber" read -- member --; column 14, line 40, for "herewith" read -- therewith --; line 69, for "predtermined" read -- predetermined --.

Signed and sealed this 10th day of July 1962.

(SEAL)
Attest:

ERNEST W. SWIDER
Attesting Officer

DAVID L. LADD
Commissioner of Patents